(12) United States Patent
Lee et al.

(10) Patent No.: US 12,012,041 B2
(45) Date of Patent: Jun. 18, 2024

(54) VEHICLE CONTROL SYSTEM

(71) Applicants: Chong Suk Lee, Gimpo-si (KR); Young Seong Kim, Gimpo-si (KR)

(72) Inventors: Chong Suk Lee, Gimpo-si (KR); Young Seong Kim, Gimpo-si (KR)

( * ) Notice: Subject to any disclaimer, the term of this patent is extended or adjusted under 35 U.S.C. 154(b) by 0 days.

(21) Appl. No.: 17/894,953

(22) Filed: Aug. 24, 2022

(65) Prior Publication Data

US 2023/0092291 A1    Mar. 23, 2023

(51) Int. Cl.
*B60Q 9/00* (2006.01)
*G08B 7/06* (2006.01)
*B60N 2/90* (2018.01)

(52) U.S. Cl.
CPC ............... *B60Q 9/008* (2013.01); *G08B 7/06* (2013.01); *B60N 2/90* (2018.02); *B60N 2002/981* (2018.02)

(58) Field of Classification Search
CPC . B60Q 9/008; G08B 7/06; B60N 2/90; B60N 2002/981
USPC ....................................................... 340/435
See application file for complete search history.

(56) References Cited

U.S. PATENT DOCUMENTS

| | | | | |
|---|---|---|---|---|
| 8,244,410 B2* | 8/2012 | Wu | ........................ | B60W 50/14 701/1 |
| 9,881,468 B2* | 1/2018 | Yliaho | ...................... | G08B 7/06 |
| 2002/0030591 A1* | 3/2002 | Paranjpe | ................ | B60Q 9/006 340/436 |
| 2014/0350836 A1* | 11/2014 | Stettner | .............. | B62D 15/0265 356/4.01 |
| 2015/0213718 A1* | 7/2015 | Ono | ........................ | B60Q 9/008 340/435 |
| 2015/0248588 A1* | 9/2015 | Ishigami | ................... | G06T 7/60 382/104 |
| 2015/0346724 A1* | 12/2015 | Jones | ..................... | B60W 50/16 701/23 |
| 2016/0003946 A1* | 1/2016 | Gilliland | ................. | G01S 17/10 356/5.01 |
| 2017/0203690 A1* | 7/2017 | Hada | .................. | B60G 17/0195 |
| 2017/0308090 A1* | 10/2017 | Asakura | ................ | B60W 50/14 |
| 2018/0022356 A1* | 1/2018 | McBride | ............... | B60W 40/08 340/439 |
| 2018/0032822 A1* | 2/2018 | Frank | ..................... | H04N 13/20 |
| 2019/0023273 A1* | 1/2019 | Ishioka | .................. | G08G 1/167 |
| 2019/0111942 A1* | 4/2019 | Suzuki | .................. | B60W 10/20 |

(Continued)

FOREIGN PATENT DOCUMENTS

| | | |
|---|---|---|
| KR | 10-1023951 B1 | 3/2011 |
| KR | 10-2014-0059083 A | 5/2014 |
| KR | 10-2017-0138648 A | 12/2017 |

*Primary Examiner* — Kerri L McNally
*Assistant Examiner* — Thang D Tran
(74) *Attorney, Agent, or Firm* — Han's Law Office

(57) ABSTRACT

A vehicle control system according to an embodiment of the present disclosure may include a detection unit, a control unit and a plurality of devices. The detection unit may detect an object around a vehicle to output detection information provided from the object. The control unit may provide a mode signal and a control signal corresponding to a plurality of operation modes, based on the detection information. The plurality of devices may be driven based on the mode signal and the control signal.

The vehicle control system according to the present disclosure may prevent drowsy driving on a road by allowing the plurality of devices to be driven based on the detection information provided by detecting the object around the vehicle.

8 Claims, 6 Drawing Sheets

(56) References Cited

U.S. PATENT DOCUMENTS

| | | | |
|---|---|---|---|
| 2019/0143972 A1* | 5/2019 | Ishioka | B60W 30/162 |
| | | | 701/70 |
| 2019/0204827 A1* | 7/2019 | Bhalla | B60W 50/16 |
| 2019/0315274 A1* | 10/2019 | Mehdi | G05D 1/0223 |
| 2020/0166362 A1* | 5/2020 | Ichinokawa | G01C 21/3602 |
| 2020/0284872 A1* | 9/2020 | Fix | B60K 35/28 |
| 2020/0324763 A1* | 10/2020 | Switkes | G08G 1/161 |
| 2020/0372263 A1* | 11/2020 | Song | G05D 1/0251 |
| 2020/0391653 A1* | 12/2020 | Karunai-Ramanujam | |
| | | | G08G 1/166 |
| 2021/0237776 A1* | 8/2021 | Hashimoto | G06V 10/764 |
| 2021/0276484 A1* | 9/2021 | Kim | B60Q 9/00 |
| 2022/0073065 A1* | 3/2022 | Chung | B60W 30/0956 |
| 2022/0135165 A1* | 5/2022 | Tamashima | B60W 10/18 |
| | | | 701/96 |
| 2022/0227416 A1* | 7/2022 | Suzuki | B62D 15/025 |
| 2022/0292981 A1* | 9/2022 | Lee | G08G 1/096791 |

\* cited by examiner

| MODE | OPERATION | REFERENCE POINT(RP) |
|---|---|---|
| FIRST OPERATION MODE | DISPLAY | 30 |
| SECOND OPERATION MODE | VIBRATION | 70 |
| THIRD OPERATION MODE | SOUND | 100 |

| RESULT POINT(RE) | DISTANCE POINT(DP) | LANE POINT(LP) |
|---|---|---|
| 80 | 50 | 30 |
| 85 | 35 | 50 |
| 90 | 60 | 30 |

VEHICLE CONTROL SYSTEM

CROSS-REFERENCE TO RELATED APPLICATION(S)

This application claims benefit of priority to Korean Patent Application No. 10-2021-0124824 filed on Sep. 17, 2021 in the Korean Intellectual Property Office, the disclosure of which is incorporated herein by reference in its entirety.

BACKGROUND

1. Field

The present disclosure relates to a vehicle control system.

2. Description of Related Art

In recent years, traffic accidents related to drowsy driving frequently occur on roads including highways. In a traffic accident caused by the drowsy driving, there is a high possibility of personal injury. Currently, various studies are being actively conducted to prevent the drowsy driving on such roads.

RELATED ART DOCUMENT

Patent Document

Korean Patent No. 10-1023951 (registered on Mar. 15, 2011)

SUMMARY

An aspect of the present disclosure may provide a vehicle control system which may prevent drowsy driving on a road by allowing a plurality of devices to be driven based on detection information provided by detecting an object around a vehicle.

A vehicle control system according to an embodiment of the present disclosure may include a detection unit, a control unit and a plurality of devices. The detection unit may detect an object around a vehicle to output detection information provided from the object. The control unit may provide a mode signal and a control signal corresponding to a plurality of operation modes, based on the detection information. The plurality of devices may be driven based on the mode signal and the control signal.

The detection unit may include a first detection unit and a second detection unit. The first detection unit may detect the object in front of the vehicle to provide distance information corresponding to a distance between the vehicle and the object. The second detection unit may provide lane information corresponding to a distance between the vehicle and a lane disposed in a direction of each of two sides of the vehicle.

The detection unit may include a point calculation unit and a mode determination unit. The point calculation unit may calculate a distance point and a lane point by scoring the distance information and the lane information, respectively. The mode determination unit may provide the mode signal and the control signal by selecting one operation mode from the plurality of operation modes, based on the distance point and the lane point.

The plurality of devices may include a display device, a vibration device and a sound device. The display device may be operated in a first operation mode among the plurality of operation modes. The vibration device may be operated in a second operation mode among the plurality of operation modes. The sound device may be operated in a third operation mode among the plurality of operation modes.

The display device may be operated in the first operation mode to turn on a notification lamp included in the display device when a result point corresponding to a sum of the distance point and the lane point is greater than or equal to a predetermined first reference point. Color of the notification lamp may be changed whenever the result point is increased by a first step point predetermined based on the first reference point.

The vibration device may be disposed on the steering wheel and seat of the vehicle, and operated in the second operation mode to vibrate the steering wheel and the seat in a first direction and in a second direction perpendicular to the first direction, respectively, when the result point is greater than or equal to a predetermined second reference point.

The steering wheel may be vibrated in the first direction and the seat may be vibrated in the second direction when the distance point is greater than the lane point. A vibration distance in the first direction or the second direction may be increased as the result point is increased by a second step point predetermined based on the second reference point.

The steering wheel may be vibrated in the second direction and the seat may be vibrated in the first direction when the distance point is smaller than the lane point.

The number of the vibrations in the first and second directions of the steering wheel and the seat may be determined based on a ratio of the distance point and the lane point.

The sound device may be operated in the third operation mode to provide a notification sound when the result point is greater than or equal to a predetermined third reference point.

In addition to the above-mentioned technical tasks of the present disclosure, other features and advantages of the present disclosure may be described below, or may be clearly understood by those skilled in the art to which the present disclosure pertains from such description and explanation.

DETAILED DESCRIPTION

Figure 1:
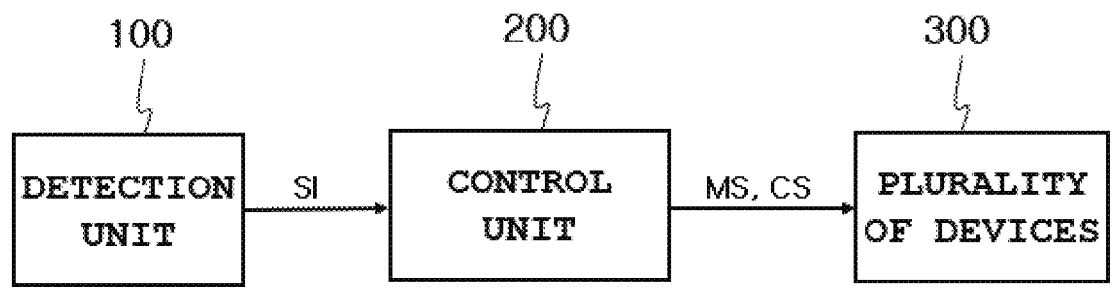
FIG. 1 is a view showing a vehicle control system according to embodiments of the present disclosure.

In the specification, in adding reference numerals to components throughout the drawings, it is to be noted that like reference numerals designate like components even though components are shown in different drawings.

Meanwhile, meanings of the terms described in this specification should be understood as follows.

Singular forms used herein are intended to include plural forms unless explicitly indicated otherwise, and a scope of the present disclosure is not limited by the terms used herein.

It is to be understood that a term "include" or "have" does not preclude the presence or addition of one or more other features, numerals, operations, components, parts or combinations thereof, which is mentioned in the specification.

Hereinafter, embodiments of the present disclosure are described in detail with reference to the accompanying drawings.

Figure 2:
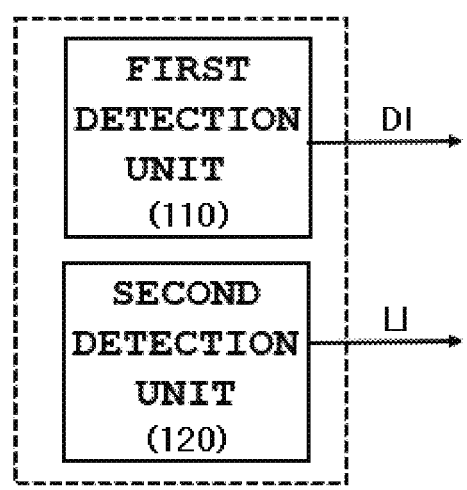
FIG. 2 is a view showing a detection unit included in the vehicle control system of FIG. 1.
Figure 3:
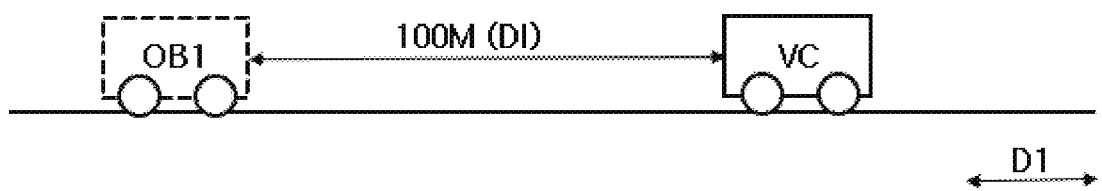
FIGS. 3 and 4 are views for explaining detection information used in the vehicle control system of FIG. 1.
Figure 4:
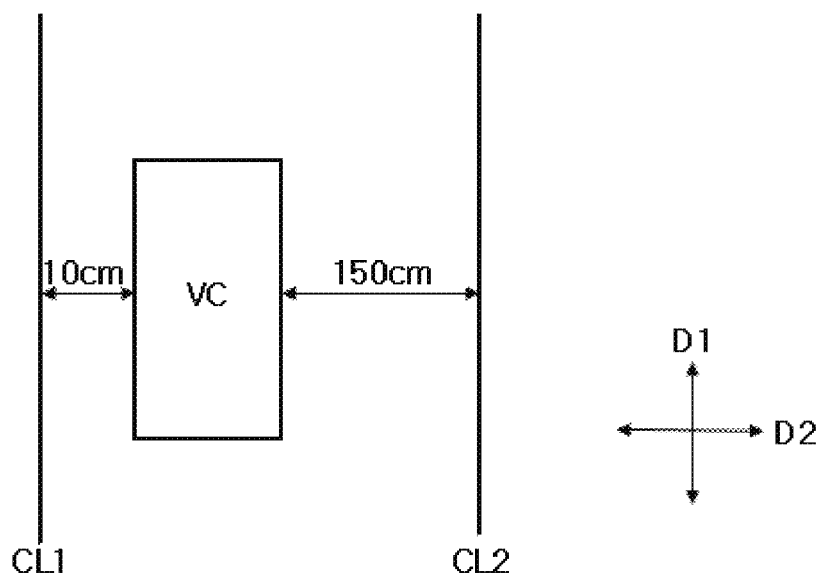

FIG. 1 is a view showing a vehicle control system according to embodiments of the present disclosure; FIG. 2 is a view showing a detection unit included in the vehicle control system of FIG. 1; and FIGS. 3 and 4 are views for explaining detection information used in the vehicle control system of FIG. 1.

Referring to FIGS. 1 to 4, a vehicle control system 10 according to an embodiment of the present disclosure may include a detection unit 100, a control unit 200 and a plurality of devices 300. The detection unit 100 may detect an object around a vehicle VC to output detection information SI provided from the object. For example, the object around the vehicle VC may be a preceding vehicle OB1 on a road. Alternatively, the object may be a first line CL1 or a second line CL2, disposed in a direction of each of two sides of the vehicle VC traveling on the road. The first line CL1 and the second line CL2 may be lanes dividing the road.

In addition, the detection unit 100 may include a first detection unit 110 and a second detection unit 120. The first detection unit 110 may detect the object in front of the vehicle VC to provide distance information DI corresponding to a distance between the vehicle VC and the object. The second detection unit 120 may provide lane information LI corresponding to a distance between the vehicle VC and the lane disposed in the direction of each of the two sides of the vehicle VC. The detection information SI may include the distance information DI and the lane information LI. For example, the first detection unit 110 may include a first lidar sensor. The first detection unit 110 may measure a distance to the first object OB1 by using the first lidar sensor disposed in front of the vehicle VC. The distance between the first object OB1 and the vehicle VC may be 100 meters, and the distance information DI corresponding to 100 meters, which is the distance between the first object OB1 and the vehicle VC, may be provided through the first detection unit 110.

In addition, the second detection unit 120 may include a second lidar sensor and a third lidar sensor. The second lidar sensor and the third lidar sensor may be disposed on the two sides of the vehicle VC to measure a distance between the first line CL1 and the vehicle VC and a distance between the second line CL2 and the vehicle VC. For example, the distance between the vehicle VC and the first line CL1 measured through the second lidar sensor may be 10 cm, and the distance between the vehicle VC and the second line CL2 measured through the third lidar sensor may be 150 cm. The lane information LI corresponding to the distance between the vehicle VC and the first line CL1 of 10 cm and the distance between the vehicle VC and the second line CL2 of 150 cm may be provided through the second detection unit 120.

The control unit 200 may provide a mode signal MS and a control signal CS corresponding to a plurality of operation modes, based on the detection information SI. The plurality of devices 300 may be driven based on the mode signal MS and the control signal CS. The vehicle control system 10 according to the present disclosure may prevent drowsy driving on a road by driving the plurality of devices 300 based on the detection information SI provided by detecting the object around the vehicle VC.

Figure 5:
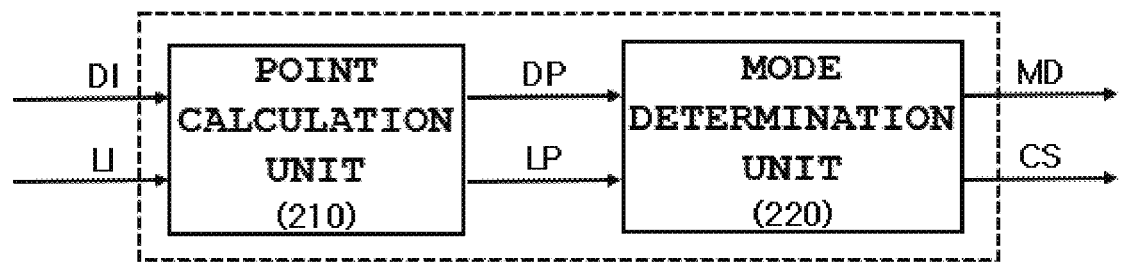
FIG. 5 is a view showing a control unit included in the vehicle control system of FIG. 1.
Figure 6:
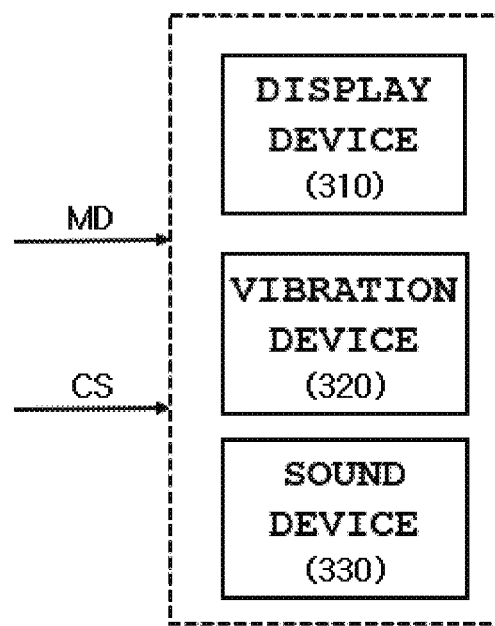
FIG. 6 is a view showing a plurality of devices included in the vehicle control system of FIG. 1.
Figures 7, 8:
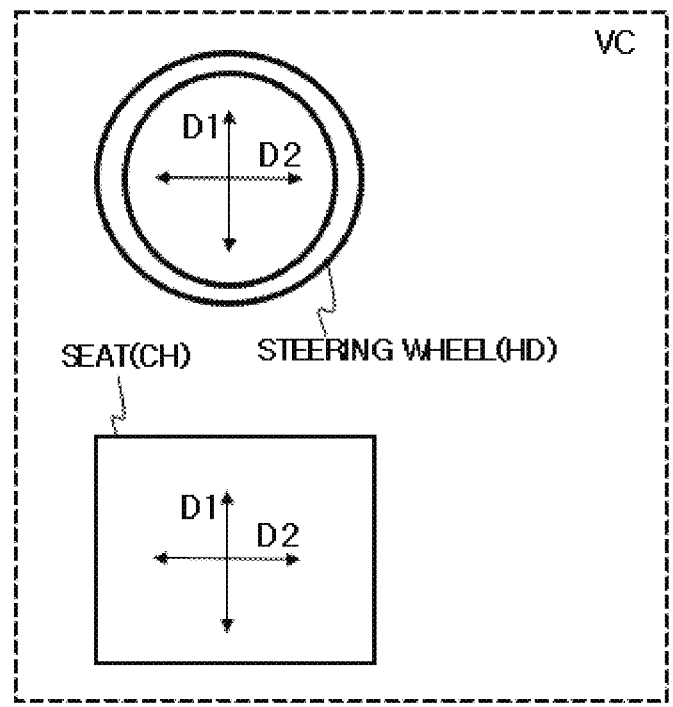
FIG. 7 is a view for explaining operation modes of the vehicle control system of FIG. 1.
FIGS. 8 and 9 are views for explaining a second operation mode among the operation modes of the vehicle control system of FIG. 1.

FIG. 5 is a view showing the control unit included in the vehicle control system of FIG. 1; FIG. 6 is a view showing the plurality of devices included in the vehicle control system of FIG. 1; and FIG. 7 is a view for explaining the operation modes of the vehicle control system of FIG. 1.

Referring to FIGS. 1 to 7, the vehicle control system 10 according to an embodiment of the present disclosure may include the detection unit 100, the control unit 200 and the plurality of devices 300. The control unit 200 may include a point calculation unit 210 and a mode determination unit 220. The point calculation unit 210 may calculate a distance point DP and a lane point LP by scoring the distance information DI and the lane information LI, respectively. For example, the point calculation unit 210 may calculate the distance point DP based on the distance information DI provided from the detection unit 100. The distance point DP may be increased as the distance between the first object OB1 and the vehicle VC, measured using the first lidar sensor included in the first detection unit 110, is decreased, and the distance point DP may be decreased as the distance between the first object OB1 and the vehicle VC, measured using the first lidar sensor included in the first detection unit 110, is increased.

In addition, the point calculation unit 210 may calculate the lane point LP based on the lane information LI provided from the detection unit 100. For example, the lane point LP may be increased as the distance between the first line CL1 and the vehicle VC, measured using the second lidar sensor included in the second detection unit 120, is larger or smaller than a reference distance, and the lowest lane point LP may be obtained when the distance between the first line CL1 and the vehicle VC, measured using the second lidar sensor included in the second detection unit 120, is maintained as the reference distance. When the distance between the first line CL1 and the vehicle VC is maintained as the reference distance, it may indicate that the vehicle VC is operated between the first line CL1 and the second line CL2. In addition, the lane point LP may be increased as the distance between the second line CL2 and the vehicle VC, measured using the third lidar sensor included in the second detection unit 120, is larger or smaller than the reference distance, and the lowest lane point LP may be obtained when the distance between the second line CL2 and the vehicle VC, measured using the third lidar sensor included in the second detection unit 120, is maintained as the reference distance.

The mode determination unit 220 may provide the mode signal MS and the control signal CS by selecting one operation mode from the plurality of operation modes, based on the distance point DP and the lane point LP. The plurality of operation modes may include a first operation mode M1, a second operation mode M2 and a third operation mode M3.

In an embodiment, the plurality of devices 300 may include a display device 310, a vibration device 320 and a sound device 330. For example, the display device may be operated in the first operation mode among the plurality of operation modes. The vibration device 320 may be operated in the second operation mode M2 among the plurality of operation modes. The sound device 330 may be operated in the third operation mode M3 among the plurality of operation modes.

In an embodiment, the display device 310 may be operated in the first operation mode M1 to turn on a notification lamp included in the display device 310 when a result point RE corresponding to a sum of the distance point DP and the lane point LP is greater than or equal to a predetermined first reference point RP1. For example, the distance between the vehicle VC and the preceding vehicle OB1 may be narrowed while the vehicle VC travels the road. Here, the distance point DP calculated based on the distance information DI provided from the first detection unit 110 may be 20 points, and the lane point LP calculated based on the lane information LI provided from the second detection unit 120 may be 15 points. In this case, the result point corresponding to the sum of the distance point DP and the lane point LP may be 35 points. When the result point RE is 35 points, the result point RE is greater than the reference point RP of the first operation mode M1, and the vehicle control system 10 according to the present disclosure may thus be operated in the first operation mode M1. When the vehicle control system 10 is operated in the first operation mode M1, the notification lamp included in the display device 310 may blink in blue.

In an embodiment, the color of the notification lamp may be changed whenever the result point RE is increased by a first step point predetermined based on the first reference point RP1. For example, the first step point may be 5 points. The distance between the vehicle VC and the preceding vehicle OB1 may be further narrowed while the vehicle VC travels the road. Here, the distance point DP calculated based on the distance information DI provided from the first detection unit 110 may be 25 points, and the lane point LP calculated based on the lane information LI provided from the second detection unit 120 may be 15 points. In this case, the result point RE may be 40 points. Even in this case, the vehicle control system 10 according to the present disclosure may be operated in the first operation mode M1, and the result point RE may be increased by the first step point from 35 points to 40 points. Therefore, the color of the notification lamp included in the display device 310 may be changed from blue to red.

Figures 9, 10:
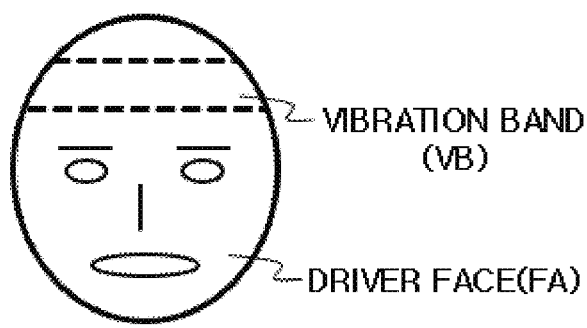
FIGS. 10 and 11 are views for explaining an embodiment of the vehicle control system of FIG. 1.
Figure 11:
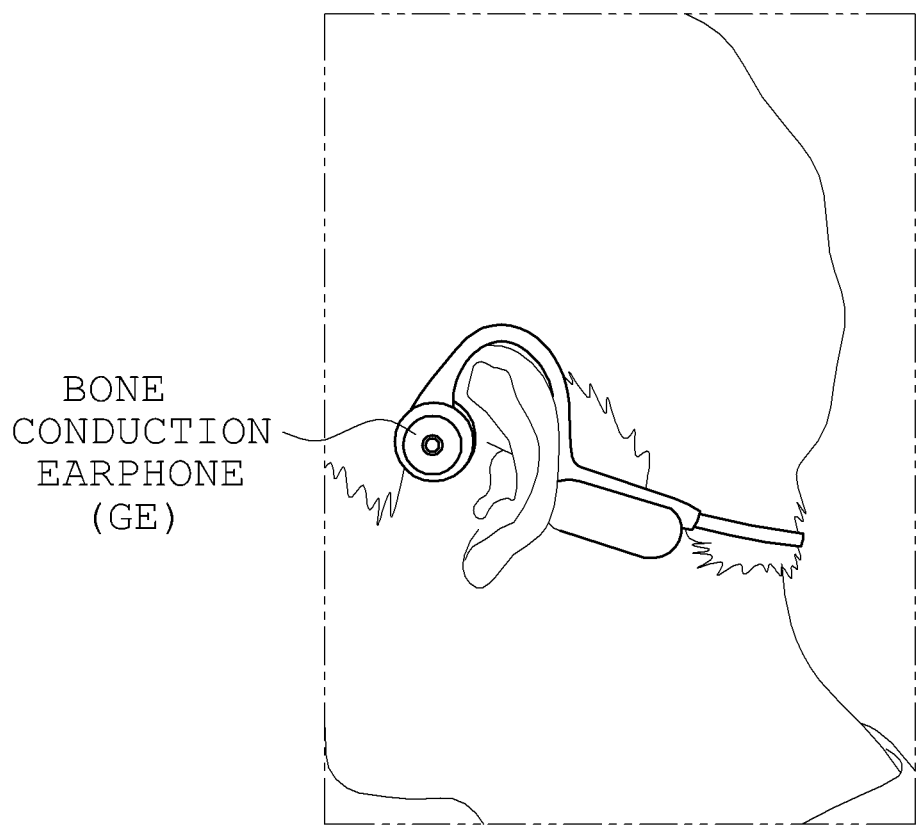

FIGS. 8 and 9 are views for explaining the second operation mode among the operation modes of the vehicle control system of FIG. 1; and FIGS. 10 and 11 are views for explaining an embodiment of the vehicle control system of FIG. 1.

Referring to FIGS. 1 to 11, in an embodiment, the vibration device 320 may be disposed on the steering wheel HD and seat CH of the vehicle VC, and operated in the second operation mode M2 to vibrate the steering wheel HD and the seat CH in a first direction D1 and in a second direction D2 perpendicular to the first direction D1, respectively, when the result point RE is greater than or equal to a predetermined second reference point RP2. For example, when the result point RE is 80 points, the vehicle control system 10 according to the present disclosure may be operated in the second operation mode M2. When the vehicle control system 10 is operated in the second operation mode M2, the steering wheel HD may be vibrated in the first direction D1, and the seat CH may be vibrated in the second direction D2 perpendicular to the first direction D1. The mode signal may be used to determine the operation mode, and the control signal may be used to control the color of the notification lamp, vibration intensity, a vibration distance and sound intensity.

In addition, in an embodiment, the steering wheel HD may be vibrated in the first direction D1 and the seat CH may be vibrated in the second direction D2 when the distance point DP is greater than the lane point LP. The vibration distance in the first direction D1 or the second direction D2 may be increased as the result point RE is increased by a second step point predetermined based on the second reference point RP2. For example, the second step point may be 5 points, and the result point RE may be 80 points. Here, the distance point DP may be 50 points, and the lane point LP may be 30 points. In this case, the distance point DP may be greater than the lane point LP. Here, the steering wheel HD may be vibrated in the first direction D1, and the seat CH may be vibrated in the second direction D2 perpendicular to the first direction D1. Then, when the distance between the vehicle and the preceding vehicle OB1 is further narrowed, the distance point DP may be 55 points, the lane point LP may be 30 points, and the result point RE may be 85 points, which is increased by 5 points, which is the second step point. In this case, the vibration distance corresponding to a width at which the steering wheel HD is vibrated in the first direction D1 may be increased, and the vibration distance corresponding to a width at which the seat CH is vibrated in the second direction D2 may also be increased.

In an embodiment, the steering wheel HD may be vibrated in the second direction D2 and the seat CH may be vibrated in the first direction D1 when the distance point DP is smaller than the lane point LP. For example, the result point RE may be 85 points. Here, the distance point DP may be 35 points, and the lane point LP may be 50 points. In this case, the distance point DP may be smaller than the lane point LP. Here, the steering wheel HD may be vibrated in the second direction D2, and the seat CH may be vibrated in the first direction D1 perpendicular to the second direction D2.

In an embodiment, the number of the vibrations in the first and second directions D1 and D2 of the steering wheel HD and the seat CH may be determined based on a ratio of the distance point DP and the lane point LP. For example, the result point RE may be 90 points. Here, the distance point DP may be 60 points, and the lane point LP may be 30 points. Here, the ratio of the distance point DP and the lane point LP may be 2:1. In this case, the steering wheel HD may be vibrated once in the second direction D2 after being vibrated twice in the first direction D1, and simultaneously, the seat CH may be vibrated once in the first direction D1 after being vibrated twice in the second direction D2.

In an embodiment, the sound device 330 may be operated in the third operation mode M3 to provide a notification sound when the result point RE is greater than or equal to a predetermined third reference point RP3. For example, when the result point RE is 110 points, the vehicle control system 10 according to the present disclosure may be operated in the third operation mode M3. In this case, the vehicle control system 10 may provide a warning sound to a driver through the sound device 330.

In an embodiment, when the result point RE is 70 points or more and less than 100 points, the vehicle control system 10 according to the present disclosure may operate a vibration band VB disposed on a driver head. When the vibration band VB disposed on the driver head is vibrated, it is possible to prevent the driver from the drowsy driving. In addition, in an embodiment, when the result point RE is 70 points or more and less than 100 points, the vehicle control system 10 according to the present disclosure may operate a bone conduction earphone GE or airpods, mounted on a driver ear. When the bone conduction earphone GE mounted on the driver ear is vibrated, it is possible to prevent the driver from the drowsy driving. In another embodiment, the vehicle control system 10 according to the present disclosure may prevent a collision of the vehicle with the preceding vehicle or a vehicle next thereto by automatically controlling a brake based on the result point RE.

As set forth above, the present disclosure as described above may provide the following effects.

The vehicle control system according to the present disclosure may prevent the drowsy driving on the road by driving the plurality of devices based on the detection information provided by detecting the object around the vehicle.

In addition, other features and advantages of the present disclosure may be newly identified through the embodiments of the present disclosure.

What is claimed is:

1. A vehicle control system comprising:
   a detection unit detecting an object around a vehicle to provide detection information provided from the object;
   a control unit providing a mode signal and a control signal corresponding to a plurality of operation modes, based on the detection information; and
   a plurality of devices driven based on the mode signal and the control signal,
   wherein the detection unit includes a first detection unit detecting the object in front of the vehicle to provide distance information corresponding to a distance between the vehicle and the object, and a second detection unit providing lane information corresponding to a distance between the vehicle and a lane disposed in a direction of each of two sides of the vehicle,
   wherein the control unit includes a point calculation unit calculating a distance point and a lane point by scoring the distance information and the lane information, respectively, and a mode determination unit providing the mode signal and the control signal by selecting one operation mode from the plurality of operation modes, based on the distance point and the lane point.

2. The vehicle control system of claim 1, wherein the plurality of devices include
   a display device operated in a first operation mode among the plurality of operation modes,
   a vibration device operated in a second operation mode among the plurality of operation modes, and
   a sound device operated in a third operation mode among the plurality of operation modes.

3. The vehicle control system of claim 2, wherein the display device is operated in the first operation mode to turn on a notification lamp included in the display device when a result point corresponding to a sum of the distance point and the lane point is greater than or equal to a predetermined first reference point, and
   color of the notification lamp is changed whenever the result point is increased by a first step point predetermined based on the first reference point.

4. The vehicle control system of claim 3, wherein the vibration device is disposed on a steering wheel and a seat of the vehicle, and operated in the second operation mode to vibrate the steering wheel and the seat in a first direction and in a second direction perpendicular to the first direction, respectively, when the result point is greater than or equal to a predetermined second reference point.

5. The vehicle control system of claim 4, wherein the steering wheel is vibrated in the first direction and the seat is vibrated in the second direction when the distance point is greater than the lane point, and
   a vibration distance in the first direction or the second direction is increased as the result point is increased by a second step point predetermined based on the second reference point.

6. The vehicle control system of claim 5, wherein the steering wheel is vibrated in the second direction and the seat is vibrated in the first direction when the distance point is smaller than the lane point.

7. The vehicle control system of claim 6, wherein the number of the vibrations in the first and second directions of the steering wheel and the seat is determined based on a ratio of the distance point and the lane point.

8. The vehicle control system of claim 7, wherein the sound device is operated in the third operation mode to provide a notification sound when the result point is greater than or equal to a predetermined third reference point.

* * * * *